United States Patent Office 2,741,652
Patented Apr. 10, 1956

2,741,652
PRODUCTION OF COPOLYMERS

Alfred L. Miller, Roselle, N. J., assignor to Celanese Corporation of America, New York, N. Y., a corporation of Delaware No Drawing. Application June 5, 1952,
Serial No. 291,975

1 Claim. (Cl. 260—85.5)

This invention relates to the production of polymers and relates more particularly to a novel process for the production of polymers by the copolymerization of acrylonitrile and an $\alpha,\beta$-unsaturated acid amide.

An important object of this invention is to provide a novel process for the production of polymers by the copolymerization of acrylonitrile and an $\alpha,\beta$-unsaturated acid amide which will be efficient and inexpensive and which will yield products having a high intrinsic viscosity.

A further object of this invention is to provide a process for the production of polymers by the copolymerization of acrylonitrile and an $\alpha,\beta$-unsaturated acid amide in an aqueous medium containing a water-miscible organic solvent.

Other objects of this invention will be apparent from the following detailed description and claim.

According to the present invention, polymers are produced by copolymerizing acrylonitrile and an $\alpha,\beta$-unsaturated acid amide in an aqueous medium containing a water-miscible organic solvent. The polymers obtained in this manner have a high intrinsic viscosity and are well suited for a wide variety of applications. Depending upon their precise composition, they are soluble in readily available, inexpensive solvents, forming solutions which may be employed for the production of filamentary materials, films and the like, for example, by dry-spinning or wet-spinning processes. The polymers have a good affinity for and are readily dyed by a large number of commercially available dyestuffs. In addition, their melting point is relatively high so that they are suitable for use in textiles and the like.

In carrying out the polymerization, the concentration of the water-miscible organic solvent is kept at a low value to obtain products having the highest intrinsic viscosity. Advantageously, the concentration of water-miscible organic solvent in the aqueous polymerization medium is maintained at a value between the minimum which will dissolve all the monomers to form a homogeneous solution and a concentration of about 60 percent by volume or preferably about 35 percent by volume. When lower concentrations of water-miscible organic solvent are present, all of the monomers do not dissolve and the polymerization may not go to completion, or, if it does go to completion, will produce a more heterogenous product. On the other hand, when higher concentrations of water-miscible solvent are employed, the intrinsic viscosity of the polymers is reduced. The extent of such reduction in viscosity will depend, to some extent, on the nature of the water-miscible organic solvent as pointed out more fully below.

Suitable water-miscible organic solvents that may be employed to form the polymerization medium include, for example, the low molecular weight alcohols, such as methanol, ethanol, N-propanol, iso-propanol, N-butanol, iso-butanol and tertiary-butanol. There is some tendency for the alcohols to act as chain transfer agents interrupting the growth of the polymer chain. The low concentration of alcohol employed in the polymerization medium keeps this effect to a minimum and permits the production of polymers of high intrinsic viscosity. In addition, it has been found that by employing secondary or preferably tertiary alcohols this effect may be reduced even further to permit the production of polymers of extremely high intrinsic viscosity. The presence of a water-miscible organic solvent permits the polymerization to be carried out with higher concentrations of monomers so that a larger quantity of polymer may be produced in a reaction vessel of given volume. Monomer-solvent ratios that have been found suitable for the production of polymers of high intrinsic viscosity range from about 25 to 100 grams of monomer per liter of solvent.

Examples of suitable $\alpha,\beta$-unsaturated acid amides, that may be copolymerized with acrylonitrile according to the process of the present invention, include N-methyl acrylamide, N-ethyl acrylamide, N-propyl acrylamide, N-butyl acrylamide, N-octyl acrylamide and the like, N-phenyl acrylamide and the corresponding methacrylamides. A particularly valuable class of $\alpha,\beta$-unsaturated acid amides that may be copolymerized with acrylonitrile are those in which the nitrogen atom carries a substituent linked thereto by a tertiary carbon atom or by a secondary carbon atom forming part of a cycloalkyl group as described in application S. No. 164,855, filed May 27, 1950. Examples of $\alpha,\beta$-unsaturated acid amides falling within this class are N-tertiary butyl acrylamide, N-tertiary amyl acrylamide, N - (dimethyl - phenyl - carbinyl) - acrylamide, N-cyclohexyl acrylamide, N-cyclopentyl acrylamide and the corresponding methacrylamides, N-tertiary butyl crotonamide, N-tertiary butyl cinnamamide, N-tertiary amyl crotonamide, N-cyclohexyl cinnamamide, N-cyclopentyl crotonamide and N-cyclopentyl cinnamamide.

The percentage of acrylonitrile in the polymer will vary depending upon the properties it is desired to obtain in the final product. Generally, good results are obtained when the monomer mixture contains at least about 5 percent by weight of acrylonitrile, or, preferably, between about 10 and 90 percent by weight of acrylonitrile. This will yield polymers having a lower percentage of acrylonitrile because the $\alpha,\beta$-unsaturated acid amide apparently polymerizes at a somewhat faster rate than the acrylonitrile.

The polymerization may be carried out at temperatures of between about 20 and 80° C., or even at temperatures below 0° C., and will usually be completed in between about 1 and 6 hours. In addition to the monomers, the polymerization medium will contain catalysts, initiators and the like, all as well known in the art. Suitable catalysts, which may be present in concentrations of between about 0.5 and 3% by weight based on the total weight of the monomer, include, for example, potassium persulfate, ammonium persulfate and benzoyl peroxide. Suitable initiators, which may be present in concentrations of between about 0.1 and 1.5% by weight based on the total weight of the monomer include, for example, sodium metabisulfite, and iron salts.

The following examples are given to illustrate this invention further.

Example I

Into a vessel equipped with a stirrer, there are charged 465 parts by weight of aqueous methanol, 20 parts by weight of acrylonitrile and 5 parts by weight of N-cyclohexylacrylamide, and the vessel is purged with nitrogen. The temperature is raised to 45° C. and there is then introduced into the vessel aqueous solutions containing 0.5 part by weight of potassium persulfate in 25 parts by weight of water and 0.25 part by weight of sodium metabisulfite in 10 parts by weight of water. The original concentration of the methanol is such that after the addition of the water the methanol concentration is 25% by volume. The solution is stirred for 4 hours and the polymer which precipitates out of the polymerization medium is recovered, washed and dried. There are obtained 21 parts by weight, or 84% of theory, of a polymer containing 74% by weight of acrylonitrile as determined by nitrogen analysis. The polymer has an intrinsic viscosity of 1.45 in dimethylformamide.

When the polymerization is repeated in 50% by volume aqueous methanol, the yield of polymer drops to 54% of theory and the polymer has an intrinsic viscosity of only 0.57.

Example II

Into a vessel equipped with a stirrer, there are charged 950 parts by weight of aqueous tertiary butanol, 32 parts by weight of acrylonitrile and 8 parts by weight of N-cyclohexylacrylamide, and the vessel is purged with nitrogen. The temperature is raised to 45° C. and there is then introduced into the vessel aqueous solutions containing 1.0 part by weight of potassium persulfate in 25 parts by weight of water and 0.5 part by weight of sodium metabisulfite in 25 parts by weight of water. The original concentration of the tertiary butanol is such that after the addition of the water, the tertiary butanol concentration is 30% by volume. The solution is stirred for 20 hours and the polymer which precipitates out of the polymerization medium is recovered, washed and dried. There is obtained a polymer containing 74% by weight of acrylonitrile as determined by nitrogen analysis. The polymer has an intrinsic viscosity of 1.45 in dimethylformamide.

When the polymerization is repeated in 50% by volume aqueous tertiary-butanol, the polymer has an intrinsic viscosity of only 0.68.

Example III

Into a vessel equipped with a stirrer, there are charged at a temperature of 27° C., 13,400 parts by weight of aqueous methanol, containing 25.4% by volume of methanol, 175 parts by weight of acrylonitrile and 325 parts by weight of N-tertiary butyl acrylamide, and the vessel is purged with nitrogen. There is then introduced into the vessel 1.0 part by weight of potassium persulfate in 25 parts by weight of water and 0.5 part by weight of sodium metabisulfite in 25 parts by weight of water. The solution is stirred for 4 hours and the polymer which precipitates out of the polymerization medium is recovered, washed and dried. There are obtained 273 parts by weight, or 55% of theory, of a polymer containing 39.9% by weight of acrylonitrile as determined by nitrogen analysis. The polymer has an intrinsic viscosity of 2.14 in dimethylformamide.

It is to be understood that the foregoing detailed description is given merely by way of illustration and that many variations may be made therein without departing from the spirit of my invention.

Having described my invention, what I desire to secure by Letters Patent is:

A process for the production of polymers which comprises copolymerizing in 30% by volume aqueous tertiary butanol 32 parts by weight of acrylonitrile and 8 parts by weight N-cyclohexylacrylamide in the presence of 1 part by weight of potassium persulfate and 0.5 part by weight of sodium metabisulfite for a period of 20 hours at a temperature of 45° C.

References Cited in the file of this patent

UNITED STATES PATENTS

| | | |
|---|---|---|
| 2,456,360 | Arnold | Dec. 14, 1948 |
| 2,546,220 | Fryling | Mar. 27, 1951 |
| 2,560,680 | Allewelt | July 17, 1951 |
| 2,566,821 | Brown et al. | Sept. 4, 1951 |
| 2,567,109 | Howard | Sept. 4, 1951 |
| 2,587,465 | Ham et al. | Feb. 26, 1952 |